(12) United States Patent
Thrasher

(10) Patent No.: US 7,286,799 B2
(45) Date of Patent: Oct. 23, 2007

(54) REMOTE CALLER IDENTIFICATION (ID) DEVICE

(76) Inventor: Steven Thrasher, 391 Sandhill Dr., Richardson, TX (US) 75080

( * ) Notice: Subject to any disclaimer, the term of this patent is extended or adjusted under 35 U.S.C. 154(b) by 583 days.

(21) Appl. No.: 10/794,652

(22) Filed: Mar. 4, 2004

(65) Prior Publication Data

US 2004/0176142 A1 Sep. 9, 2004

Related U.S. Application Data

(60) Provisional application No. 60/451,634, filed on Mar. 4, 2003.

(51) Int. Cl.
*H04B 7/00* (2006.01)
(52) U.S. Cl. .............. 455/41.2; 455/566; 455/415; 455/563; 455/461; 455/426.1; 455/557; 379/142.01; 379/93.35; 379/188; 379/373.01
(58) Field of Classification Search ............. 455/41.2, 455/426.1, 461, 466, 554.1, 566, 563, 557, 455/556.2, 415; 379/188, 148
See application file for complete search history.

(56) References Cited

U.S. PATENT DOCUMENTS

| | | | | |
|---|---|---|---|---|
| 5,787,154 A * | 7/1998 | Hazra et al. | .............. | 379/93.03 |
| 5,930,700 A * | 7/1999 | Pepper et al. | ............. | 455/435.3 |
| 6,052,444 A * | 4/2000 | Ferry et al. | .............. | 379/93.35 |
| 6,128,382 A * | 10/2000 | Borland et al. | ......... | 379/373.01 |
| 6,366,772 B1 * | 4/2002 | Arnson | ...................... | 455/415 |
| 6,404,868 B1 * | 6/2002 | Beamish et al. | ....... | 379/142.01 |
| 6,449,359 B1 * | 9/2002 | Luzzatto et al. | ........ | 379/373.01 |
| 6,633,635 B2 * | 10/2003 | Kung et al. | ............ | 379/215.01 |
| 6,816,481 B1 * | 11/2004 | Adams et al. | .............. | 370/352 |
| 6,831,969 B2 * | 12/2004 | Ju | ......................... | 379/142.16 |
| 6,845,151 B2 * | 1/2005 | Peng | ..................... | 379/142.06 |
| 6,952,469 B2 * | 10/2005 | Han | ..................... | 379/142.17 |
| 6,985,753 B2 * | 1/2006 | Rodriguez et al. | ........ | 455/550.1 |

* cited by examiner

*Primary Examiner*—Marceau Milord
(74) *Attorney, Agent, or Firm*—Steven Thrasher

(57) ABSTRACT

The present invention provides technical advantages as systems, devices and methods that enable a person to remotely identify the origin of an incoming call.

1 Claim, 4 Drawing Sheets

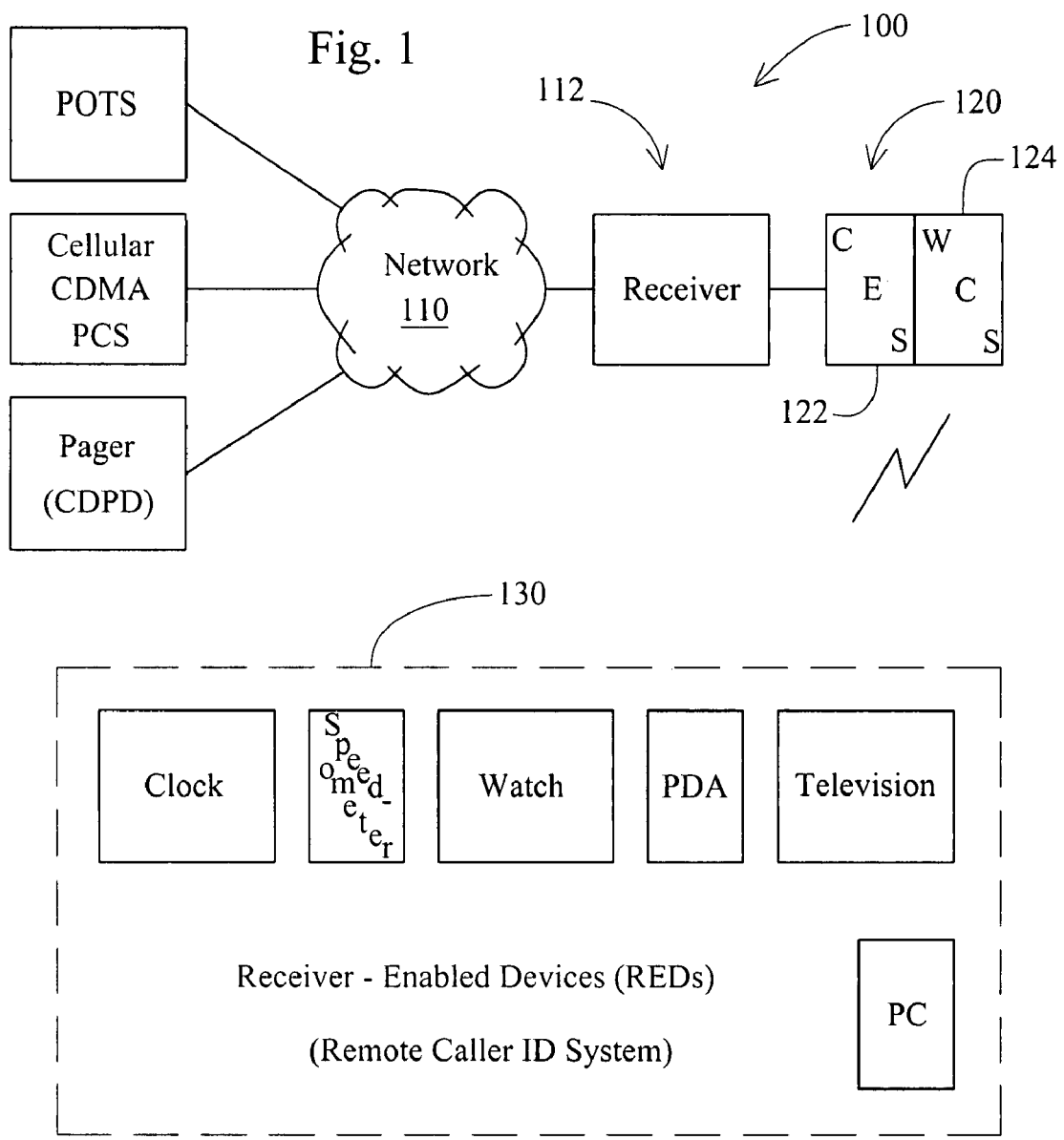

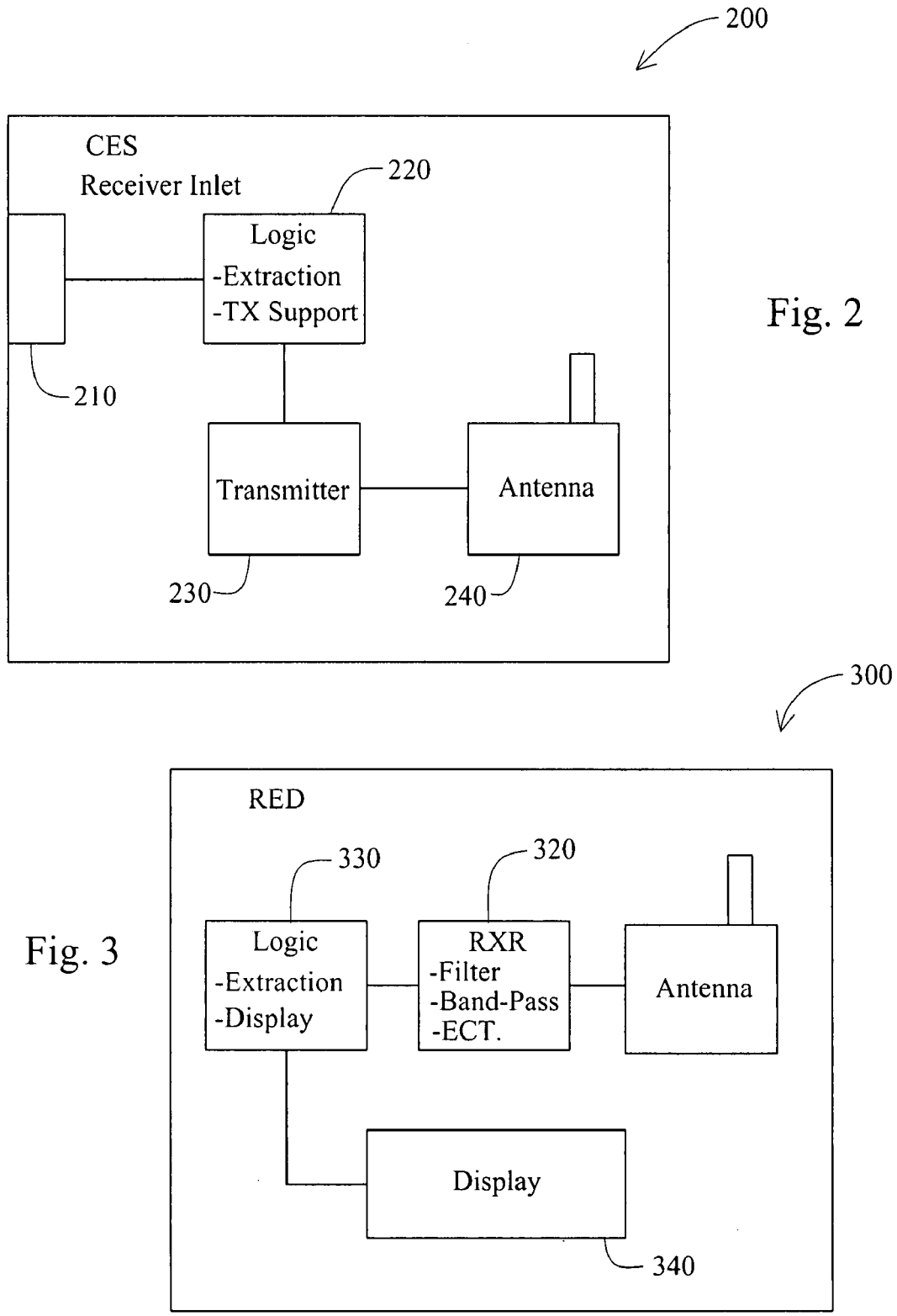

REMOTE CALLER IDENTIFICATION (ID) DEVICE

RELATED APPLICATION

This patent application is related to, and claims priority from co-owned and assigned U.S. Provisional Patent Application No. 60/451,634 to Thrasher, entitled REMOTE CALLER IDENTIFICATION (ID) DEVICE, filed on Mar. 4, 2003.

TECHNICAL FIELD OF THE INVENTION

The invention relates to display devices, and telecommunications.

PROBLEM STATEMENT

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Problem Statement is to be construed as prior art.

Discussion

Who has not been frustrated at the sound of a telephone ringing and being unable to reach a telephone receiver handset or telephone cradle to look at who is calling before the caller hangs up. Alternatively, many persons are frustrated when a telephone rings and the effort is made to look at who is calling only to discover that the call is from an undesirable person or telemarketer. Accordingly, there is a need for a device that allows a person to remotely identify a call.

BRIEF DESCRIPTION OF THE FIGURES

Various aspects of the invention, as well as an embodiment, are better understood by reference to the following detailed description. To better understand the invention, the detailed description should be read in conjunction with the drawings in which:

FIG. 1 illustrates a top-level view of a remote caller identification system;

FIG. 2 illustrates a block diagram a caller ID extraction system;

FIG. 3 illustrates a block diagram of a receiver-enabled device;

EXEMPLARY EMBODIMENT OF A BEST MODE

Interpretation Considerations

Figure 4:
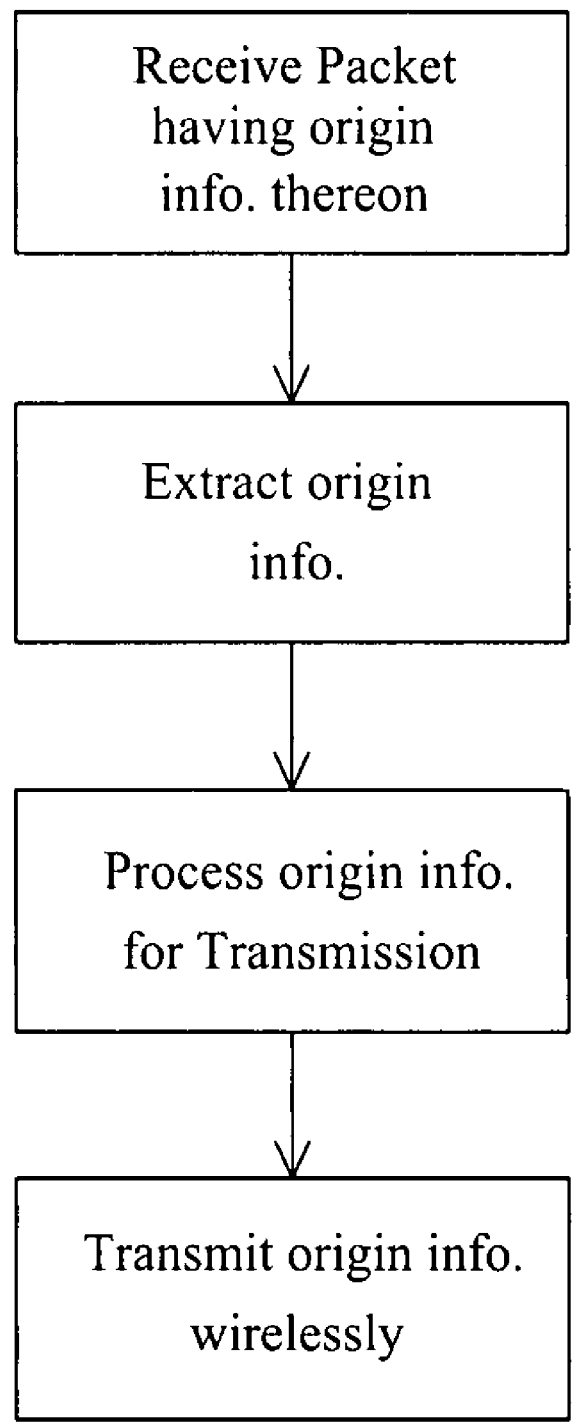
FIG. 4 illustrates a remote caller ID display algorithm.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching").

Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for -functioning-" or "step for -functioning-" in the Claims section. Sixth, the invention is also described in view of the Festo decisions, and, in that regard, the claims and the invention incorporate equivalents known, foreseeable, and unforeseeable. Seventh, the interpretation of the language and the interpretation of each word herein, including especially in the claims, should be given the ordinary plain meaning and interpretation, unless indicated otherwise.

Computer Systems as Software Platforms

A computer system typically comprises hardware capable of executing machine-readable instructions, as well as software for executing acts typically as machine-readable instructions that produce a desired result. In addition, a computer system may include hybrids of hardware and software, as well as computer sub-systems.

Software may be defined as machine code stored in memory, such as RAM or ROM, or machine code stored on devices (such as memory card, for example). Software may include executable code, an operating system, or source or object code, for example. In addition, software encompasses any set of instructions capable of being executed in a client machine or server—and, in this form, is often called a program or executable code.

Programs often execute in portions of code at a time. These portions of code are sometimes called modules or code-segments. Often, but not always, these code segments are identified by a particular function that they perform. For example, a counting module (or "counting code segment") may monitor the value of a variable. Furthermore, the execution of a code segment or module is sometimes called an act. Accordingly, software may be used to perform a method that comprises acts. In the present discussion, sometimes acts are referred to as steps to help the reader more completely understand the exemplary embodiment.

Software also includes description code. Description code specifies variable values and uses these values to define attributes for a display, such as the placement and color of an item on a displayed page. For example, the Hypertext Transfer Protocol (HTTP) is the software used to enable the Internet and is a description software language.

Hybrids (combinations of software and hardware) are becoming more common as devices for providing enhanced functionality and performance to computer systems. A hybrid is created when traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system and are thus envisioned by the invention as possible equivalent structures and equivalent methods.

Handheld computer sub-systems are combinations of hardware or software (or hybrids) that perform some specific task. For example, one computer sub-system is a soundcard. For example, a soundcard provides hardware connections, memory, and hardware devices for enabling sounds to be produced and recorded by a computer system. Likewise, a soundcard may also include software needed to enable a computer system to "see" the soundcard, recognize the soundcard, and drive the soundcard.

Methods of the invention may be practiced by placing the invention on a computer-readable medium. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Data elements are organizations of data. One data element could be a simple electric signal placed on a data cable. One common and more sophisticated data element is called a packet. Other data elements could include packets with additional headers/footers/flags. Data signals comprise data, and are carried across transmission mediums and store and transport various data structures, and, thus, may be used to transport the invention. It should be noted in the following discussion that acts with like names are performed in like manners, unless otherwise stated.

Of course, the foregoing discussions and definitions are provided for clarification purposes and are not limiting. Words and phrases are to be given their ordinary plain meaning unless indicated otherwise.

DESCRIPTION OF THE DRAWINGS

Better understanding of the invention can be gained by examining the figures, wherein FIG. 1 illustrates one embodiment of a remote caller ID system 100. In FIG. 1, various telephone/telecommunication networks such as plain old telephone service (POTS), cellular systems (such as CDMA, GSM, PCS, for example), and pager networks (such as CDPD), are shown being in communication with network cloud 110. The network cloud generally identifies the telephone network that exists prior to feeding information into a receiver. The transmission path between the network 110 and the receiver 112 may be either wireless or wire line.

Accordingly, the receiver 112 may be a home outlet jack for a telephone, may be a cell phone, or may be a pager, for example. The receiver 112 is communicatively coupled to a combination caller ID extraction system and wireless communication system 120. The combination system 120 provides the ability to extract caller ID information received by the receiver 112 then the caller ID extraction system 122. In addition, a wireless communication system 124 takes the extracted information regarding caller identification origin and then broadcast the caller ID information wirelessly. Thus, the wireless communication system (WCS) 124 may transmit in any known wireless protocol such as VHS, UHF, a radio signal or open bands such as the 900 MHz band or the 2.4 Ghz band which are commonly used in existing telephone systems for the home. Of course, it should be understood that other wireless communication standards may be employed to transmit the caller identification origin information.

The caller identification origin information is then transmitted to a receiver-enabled device (RED) 130. A receiver enabled device is preferably a device that is capable of displaying information such as a clock, watch, television, personal computer, personal digital assistant, motor vehicle dashboard, or speedometer, for example. Of course, a receiver-enabled device is adapted to be enabled to receive a wireless signal capable of transmitting caller identification origin information such as the traditional caller ID information. Furthermore, a receiver-enabled device is adapted to both receive and then display the caller identification information on the platform appropriate for that specific receiver enabled device.

FIG. 2 illustrates one alternative embodiment of a caller ID extraction system (CES) 200. The caller ID extraction system 200 includes a receiver inlet 210 which may be a telephone jack, or antenna which is enabled to receive caller identification origin information, and any other information which may accompany the caller ID information. In one embodiment, caller ID information is received as a packet, and the caller ID extraction system receiver inlet 210 is enabled to receive the entire packet. Then, logic 220 in the caller ID extraction system 200 is adapted to receive the caller ID origin information and extract the caller ID origin information from any other superfluous data. In addition, logic 220 is enabled to then isolate the caller ID origin information and then transfer the caller ID origin information to a transmitter 230. The transmitter 230 is adapted to create a signal using any other wireless protocols previously mentioned by transferring the caller ID origin information to an antenna 240 for transmission wirelessly to a receiver-enabled device.

Thus, FIG. 3 illustrates a receiver-enabled device (RED) 300. The receiver-enabled device includes an antenna for receiving caller ID origin information. Of course, an antenna may receive any wireless information being transmitted into the RED and thus a receiver 320 is provided for filtering and then passing any data received from the antenna such that caller ID origin information is then sent to logic 330. Preferably, any audio signal information, which may be broadcast as a voice or other audio, is ignored. Logic 330 may be embodied as digital signal processor (DSP), computer processor, or specialized logic chip capable of extracting caller ID origin information and then formatting it correctly so that the caller ID origin information may be displayed on the display 340 in the receiver-enabled device 300.

A receiver-enabled device is specifically not a device specifically designed to transmit or receive telecommunications (other than short range radio signals, such as Bluetooth), but as rather a device which specifically is not traditionally associated with transmitting or receiving telecommunications. For example, a receiver-enabled device is not a pager, cell phone, blue-tooth device (which builds telecommunications capabilities in its protocol) or portable phone. However, a receiver-enabled device could be a modified clock, speedometer, watch, personal digital assistant, television, or personal computer, for example.

In addition, a receiver-enabled device may be a device whose sole purpose is to display caller ID information at any location. Accordingly, a clock with receiver-enabled device logic, a speedometer, or other automobile display with receiver-enabled device logic, a watch with receiver-enabled device logic, a personal digital assistant with receiver-enabled device receiver-enabled device logic, a television with receiver-enabled device logic, or a PC with receiver-enabled device logic, are all specific embodiments of the invention. Additionally, although a display 340 is illustrated within a preferred embodiment of a receiver-enabled device 300, it should be understood that caller ID information may be broadcast through audio as well as displayed visually.

In one embodiment, the invention is a remote caller ID display algorithm as shown in FIG. 4. The remote caller ID display algorithm begins with a receive packet at or by a packet having caller identification origin information is received by a caller ID extraction system. Then, logic in the caller ID extraction system extracts origin information in an extracting origin information act. The origin information typically embodied as a caller identification number and/or name is then sent to a wireless communication system where the origin information is processed and formatted such that the origin data may be transmitted. Then, the origin information which may include a caller identification number or caller name is broadcast wirelessly by the wireless communication system.

Figure 5:
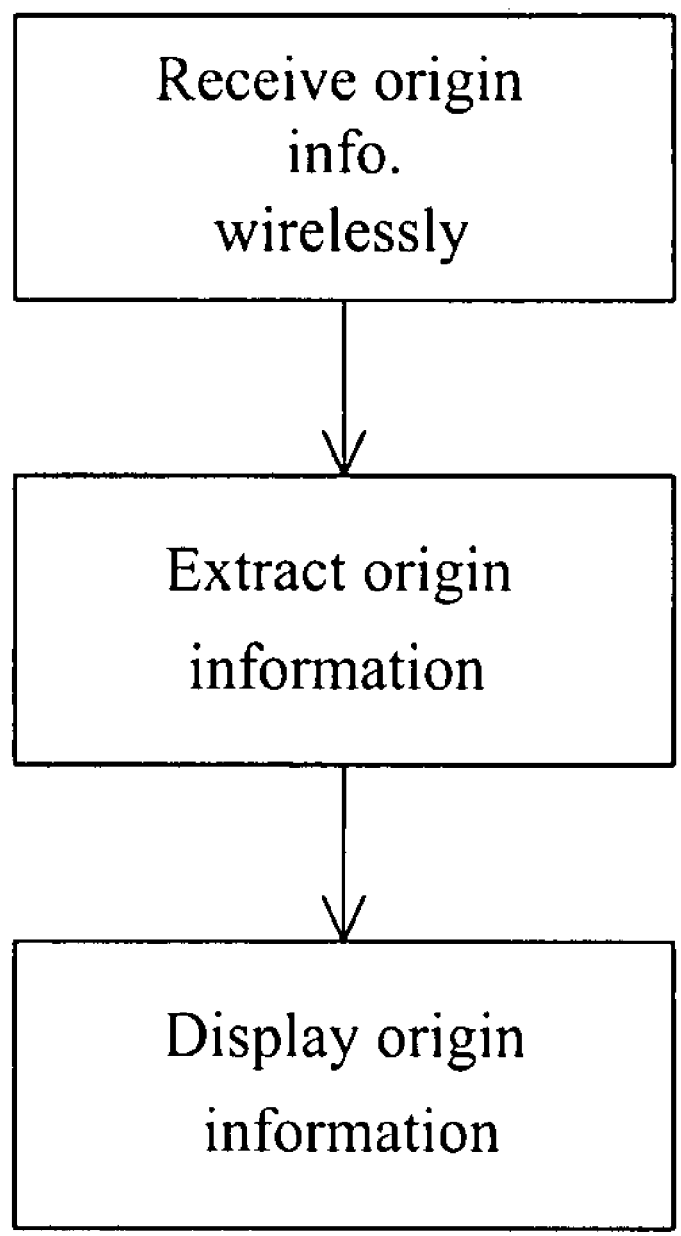
FIG. 5 illustrates an alternative remote caller ID display algorithm for a wireless caller ID extraction system.

FIG. 5 illustrates a remote caller ID display algorithm for a wireless caller ID extraction system. In this algorithm, origin information such as a caller identification origin (caller ID number) is received wirelessly, such as through a cell phone, a satellite network, or other wireless transmission. Then, the origin information is extracted from the corresponding data stream and formatted for transmission in an extract origin information act. Preferably, only data is extracted, and any audio signal portions are ignored. Then, the origin information is wirelessly retransmitted via a second network, preferably a short range radio network such as Bluetooth, to a receiver-enabled device, presumably in a location which is more easily viewable by a user, such as an automobile dashboard, or a separate device that is adapted to attach/couple to a motor vehicle interior. One specific example of the above method is understood when one considers a person driving in an automobile. A call may be received wirelessly through a cell phone or wirelessly through a satellite transmission and directly to the car.

Then, the origin information is extracted from the incoming call sequence and then redisplayed in a secondary location more convenient for the user. More specifically still, a wireless phone call may be received on a cell phone by a driver whose cell phone is maintained in the seat next to them. Rather than having to pick up the cell phone and observe the incoming call information, the person driving the car (presumably the user and owner of the cell phone) would then be able to view the incoming caller ID information on their dashboard, speedometer, or other location. Accordingly, in can be seen that in one embodiment the caller ID extraction system and wireless communication system are embodied in a module, which is attachable to a cell phone.

In yet another embodiment of the invention one may observe a receiver-enabled device algorithm. The receiver-enabled device algorithm initiates with a receive origin information act. In the receive origin information act the receiver-enabled device detects a transmission from a wireless communication system and receives caller origin information. Then, the receiver-enabled device algorithm extracts the origin information from the incoming wireless transmission in an extract origin information act, and then displays the origin information either visually on a display in the receiver-enabled device, or audibly in a display origin information act.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modification.

I claim:

1. A method of displaying telephony information on a short range radio link apparatus, comprising:
   receiving telephony information at a telephony apparatus via a telecommunications link;
   transmitting the telephony information via a short range radio link;
   wirelessly receiving telephony information via the short range radio link at a short range radio link telephony information display apparatus;
   the short range radio link telephony information display apparatus comprises a clock not having a video device;
   selecting at least a portion of the telephony information as selected information for display;
   the telephony information comprises a caller identification information; and
   displaying the selected information on the short range radio link telephony information display apparatus.

* * * * *